United States Patent [19]

Gulick, Jr.

[11] Patent Number: 5,148,702
[45] Date of Patent: Sep. 22, 1992

[54] FUEL CONSUMPTION RATE DETECTING APPARATUS FOR A VEHICLE

[76] Inventor: Joseph F. Gulick, Jr., 235 River Rd., Elkton, Md. 21921

[21] Appl. No.: 599,099

[22] Filed: Oct. 17, 1990

[51] Int. Cl.$^5$ .............................................. G01F 9/02
[52] U.S. Cl. .................................................... 73/114
[58] Field of Search ................ 73/114; 235/61 F, 61 J

[56] References Cited

U.S. PATENT DOCUMENTS

| | | | |
|---|---|---|---|
| 2,250,125 | 7/1941 | Chisholm | 73/51 |
| 2,422,240 | 6/1947 | Jackes | 171/95 |
| 2,941,397 | 6/1960 | Lee | 73/114 |
| 3,058,340 | 10/1962 | Martensson | 73/114 |
| 3,118,302 | 1/1964 | Fathauer | 73/114 |
| 3,635,079 | 1/1972 | Tomlinson | 73/114 |
| 3,812,710 | 5/1974 | Bauman et al. | 73/114 |
| 3,908,451 | 9/1975 | Walker et al. | 73/114 |
| 3,967,097 | 6/1976 | Moretti | 235/150 |
| 4,008,607 | 2/1977 | Ooiwa et al. | 73/114 |
| 4,012,949 | 3/1977 | Lanz | 73/114 |
| 4,054,781 | 10/1977 | Kuno et al. | 364/442 |

FOREIGN PATENT DOCUMENTS

| | | | |
|---|---|---|---|
| 2634864 | 2/1978 | Fed. Rep. of Germany | 73/114 |
| 2043255 | 10/1980 | United Kingdom | 73/114 |

OTHER PUBLICATIONS

Hambly, S. C. Miles-per-gallon Meter, Wireless World, vol. 77, No. 1427, May 1971, pp. 218-220.

Primary Examiner—Jerry W. Myracle
Attorney, Agent, or Firm—Antonelli, Terry, Stout & Kraus

[57] ABSTRACT

Apparatus for measuring the distance traveled by a vehicle per unit quantity of fuel. The apparatus includes a generator for generating a voltage signal proportional to the speed of the vehicle, apparatus for generating a pulse signal proportional to the volume of fuel consumed by the vehicle and a switching device for cycling between open and closed positions in response to the pulse signal. An energy storage device, electrically connected to the generator and the switching device is provided. The energy storage device stores a charge from the voltage signal when the switching device is in the open position and discharges the stored charge when the switching device is in the closed position, thereby generating a fuel consumption signal representing distance traveled per unit quantity of fuel of the vehicle. Also provided is an indicator, electrically connected to the energy storage device for indicating fuel efficiency of the vehicle in response to the fuel consumption signal. The indicator has a dynamic damping for causing it to respond to an average voltage of the fuel consumption signal.

12 Claims, 2 Drawing Sheets

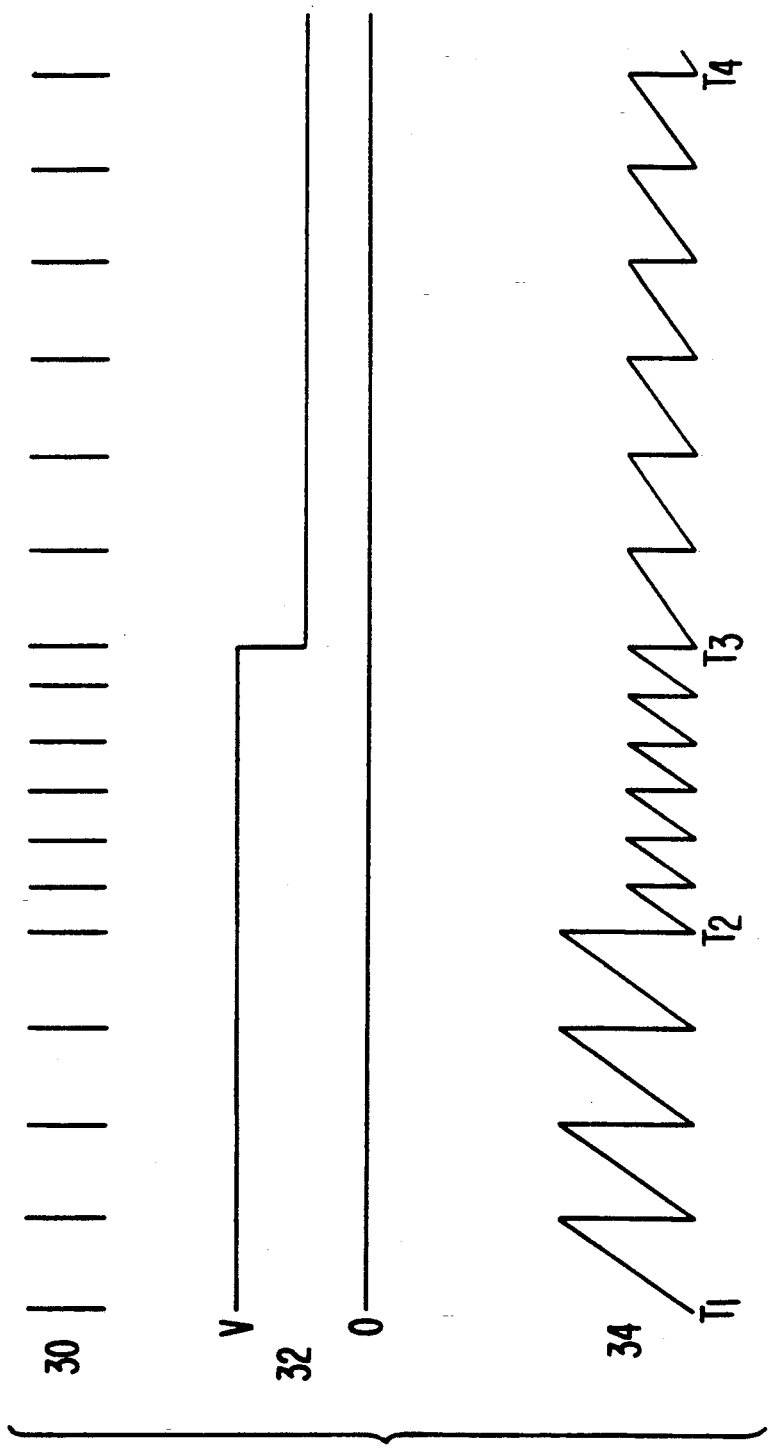

FUEL CONSUMPTION RATE DETECTING APPARATUS FOR A VEHICLE

TECHNICAL FIELD

The present invention relates to fuel consumption rate or fuel efficiency measuring systems. More particularly, the present invention relates to apparatus for measuring the distance traveled by a vehicle per unit of quantity of fuel.

BACKGROUND ART

Providing an instantaneous visual indication of the fuel efficiency or fuel consumption rate of a vehicle to the operator of the vehicle can be very important. Particularly when the fuel being consumed is very expensive or when a certain distance must be traveled with a fixed amount of fuel.

Generally known apparatus have been proposed for measuring fuel efficiency of a vehicle by performing a calculation of the vehicle distance traveled per unit of fuel. The calculation of vehicle distance traveled per unit of fuel is provided to an indicator such as a meter in the form of an electrical signal. The electrical signal causes the meter to move providing an indication of fuel efficiency or consumption. Representative of such apparatus are U.S. Pat. Nos. 2,250,125, 2,422,240, 2,941,397, 3,058,340, 3,118,302, 3,635,079, 3,812,710, 3,908,451, 3,967,097, 4,008,607, 4,012,949 and 4,054,781.

The apparatus disclosed by the above-referenced patents do not provide simple and easy to use apparatus which can provide an instantaneous measure of the fuel efficiency of a vehicle in miles per gallon.

DISCLOSURE OF INVENTION

The present invention provides apparatus for measuring the distance traveled by a vehicle per unit quantity of fuel which is simple and easy to use.

Further, the present invention provides apparatus for measuring the distance traveled by a vehicle per unit quantity of fuel which can be used in any type of vehicle such as an automobile, boat, airplane or the like.

Still further, the present invention provides apparatus for providing an instantaneous measurement of the fuel efficiency of the fuel consumption rate of a vehicle per distance traveled.

The apparatus of the present invention includes a generator for generating a voltage signal proportional to the speed of a vehicle, apparatus for generating a pulse signal proportional to the volume of fuel consumed and a switching device for cycling between open and closed positions in response to the pulse signal.

The apparatus of the present invention further provides an energy storage device electrically connected to the generator and the switching device. The energy storage device stores a charge from the voltage signal when the switching device is in the open position and discharges the stored charge when the switching device is in the closed position. The energy storage device as a result of the charging and discharging operation generates a fuel consumption signal representing distance traveled per unit quantity of fuel of the vehicle.

The energy storage device may be provided by a capacitor and the apparatus for generating a pulse signal may be provided by a fluid flow meter. The fluid flow meter may be in the form of a rotary vane flow meter.

The apparatus of the present invention further includes an indicator device electrically connected to the energy storage device for receiving the fuel consumption signal generated by the energy storage device. The indicator device includes dynamic damping of a sufficient level to cause it to respond to an average voltage of the fuel consumption signal generated by the energy storage device. The indicator device provides a visual indication of the fuel efficiency of the vehicle.

The present invention as described above outputs the fuel consumption signal as a voltage signal proportional to miles traveled per gallon of fuel by implementing the following equation:

$$V = \frac{k \text{ miles}}{\text{gallons}} = \frac{k \text{ miles}}{\text{seconds}} \times \frac{\text{seconds}}{\text{gallons}}$$

where K is the calibration factor of the apparatus and V equals miles per gallon.

BRIEF DESCRIPTION OF THE DRAWINGS

The features of the present invention which are believed to be novel are set forth with particularity in the appended claims. The invention may be best understood, however, by reference to the following description in conjunction with the accompanying drawings in which:

FIG. 2 illustrates a signal timing chart representative of the operation of the present invention.

BEST MODE FOR CARRYING OUT THE INVENTION

Figure 1:
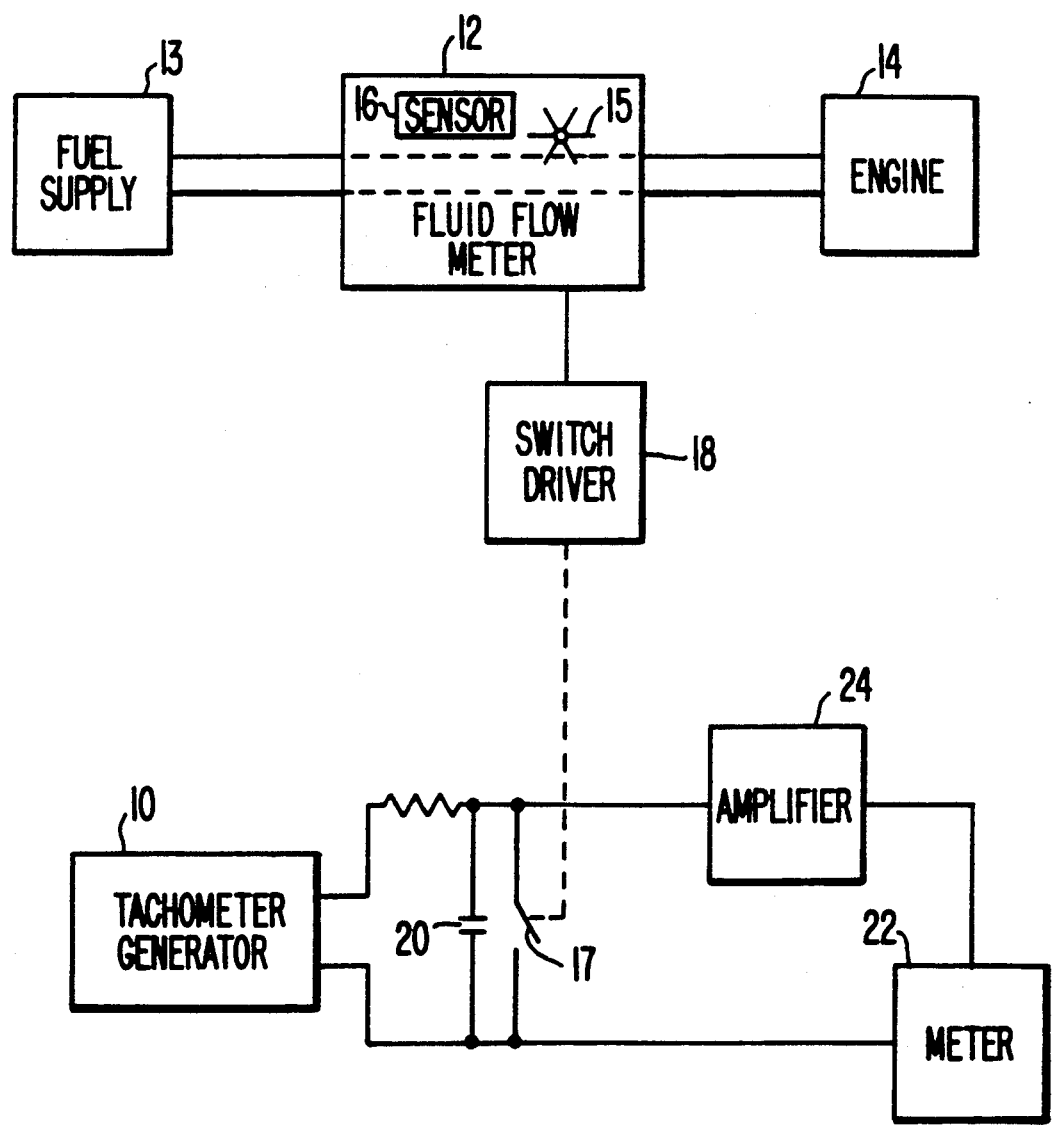
FIG. 1 illustrates the apparatus of the present invention for measuring fuel consumption as distance traveled per unit quantity of fuel.

The present invention provides apparatus for measuring the distance traveled by a vehicle per unit quantity of fuel. The present invention outputs a voltage signal which provides an instantaneous measurement of the fuel efficiency or fuel consumption rate of a vehicle. The measurement is visually indicated to the operator of the vehicle.

In order to provide a measurement of the distance traveled by a vehicle per unit quantity of fuel a measurement of the fuel flow rate and the speed of the vehicle is needed. FIG. 1 illustrates the apparatus of the present invention in this regard.

The apparatus of the present invention shown in FIG. 1 includes a tachometer generator 10 for generating a voltage signal proportional to the speed of a vehicle. The vehicle is not shown. The tachometer generator is a magnetic type generator which produces its own electrical voltage signal as a result of the movement of apparatus of the vehicle operably connected thereto. The tachometer generator 10 may be driven by the speedometer of the vehicle. For example, the speedometer cable in an automobile may be connected to the tachometer generator to thereby generate a voltage signal proportional to the speed of the vehicle.

The apparatus of the present invention also includes a fluid flow meter 12 for generating a pulse signal proportional to the volume of the fuel flowing from a fuel supply 13 to the engine 14 of the vehicle. The fuel flowing into the engine is consumed by combustion to generate locomotive force to drive the vehicle.

The fluid flow meter 12 may be provided by a rotary vane flow meter having a plurality of rotating vanes 15. The rotating vanes 15 are turned by the flow of fuel through the fluid flow meter 12. A position sensor 16 senses the rotation of the vanes 15 corresponding to a unit volume of fuel. Thus an electrical pulse is generated each time a unit volume of fuel flows through the fluid flow meter 12. In order to provide an accurate indication of the flow of fuel in the fluid flow meter 12 the effects of friction on the rotating vanes 15 must be eliminated. Therefore, the rotating vanes 15 must be mounted for frictionless rotation.

A switching device 17 is provided in the apparatus of the present invention. The switching device 17 may be a transistor or the like which is coupled to the fluid flow meter 12 through a switch driver 18. The switch driver 18 receives the pulse signal generated by the fluid flow meter 12 and causes the switching device 17 to cycle between open and closed positions in response thereto.

An energy storage device 20 is also provided in the apparatus of the present invention. The energy storage device 20 is electrically connected to the tachometer generator 10 and the switching device 17. The energy storage device stores a charge from the voltage signal provided by the tachometer generator 10 when the switching device 17 is in the open position and discharges the charge stored therein when the switching device 17 is in the closed position. By the charging and discharging operation, the energy storage device 20 generates a fuel consumption signal representing distance traveled per unit quantity of fuel of the vehicle. The energy storage device 20 may be implemented by a capacitor. The fuel consumption signal is in the form of a saw tooth wave voltage signal.

The apparatus of the present invention further includes an indicator device 22 such as a meter electrically connected to the energy storage device 20. An amplifier 24 is connected between the energy storage device 20 and the meter 22. The amplifier 24 amplifies the fuel consumption signal generated by the energy storage device 20. The meter 22 is dynamically damped at a sufficient level to cause it to respond to an average voltage of the fuel consumption signal generated by the energy storage device 20.

The apparatus of the present invention, as described above and as illustrated in FIG. 1, implements the following equation:

$$V = \frac{k \text{ miles}}{\text{gallons}} = \frac{k \text{ miles}}{\text{seconds}} \times \frac{\text{seconds}}{\text{gallons}}$$

where K is the calibration factor of the meter.

The tachometer generator 10 provides a voltage proportional to speed in miles per second. The fluid flow meter 12 provides a pulse signal proportional to quantity of fuel consumed in seconds per gallon. Thus, if the signals outputted by the tachometer generator 10, which provides a voltage proportional to miles per second and the fluid flow meter 12 which provides a pulse signal representative of seconds per gallon, are multiplied, as shown in the equation, then the signal resulting therefrom would indicate fuel efficiency in miles per gallon.

Applying the pulse signal from the fluid flow meter 12 to the switching device 17 and the voltage signal from the tachometer generator 10 to the capacitor 20 accomplishes the multiplication of the signals in order to output a signal representative of miles per gallon in accordance with the above equation. The miles per gallon voltage signal is provided to the meter 22 through the amplifier 24 to provide a visual indication of fuel efficiency of the vehicle to the operator thereof.

FIG. 2 illustrates the various signals provided in the apparatus of the present invention. As can be seen in FIG. 2, the fluid flow meter generates a series of pulses 30 which are provided to the switch driver 18. The switch driver 18 controls the switching device 17. The pulses 30 provided to the switch driver 18 causes the switching device 17 to momentarily close on each pulse. The momentary closure of the switching device 17 connects the capacitor 20 to ground potential thereby discharging the capacitor 20 to ground potential.

Opening of the switching device 17 causes the capacitor 20 to be charged by the voltage signal 32 generated by the tachometer generator 10. The capacitor 20 charges at a rate proportional to the voltage signal 32 applied thereto by the tachometer generator 10.

The fuel consumption signal output from the capacitor 20, due to the charging and discharging of the capacitor 20, is in the form of a saw tooth wave voltage signal 34. The saw tooth wave voltage signal 34 is amplified by the amplifier 24 and applied to the meter 22. The meter 22 is heavily damped in order to indicate an average voltage of the saw tooth wave voltage signal 34 output from the capacitor 20.

FIG. 2 further illustrates that the saw tooth wave voltage signal 34 being applied to the amplifier 24 from the capacitor 20 is a function of both the voltage signal 32 outputted by the tachometer generator 10 and the time between closures of the switch device 17 caused by pulse signal 30.

For example, if the time between pulses of the pulse signal 30 from the fluid flow meter drops to half of its previous value at time $t_2$ and the voltage signal 32 output by the tachometer generator 10 remains constant, then the fuel consumption is indicated as being cut in half in the saw tooth wave voltage signal 34 output by the capacitor 20. In other words, the average value of the saw tooth wave voltage signal 34 applied to the amplifier 24 from the capacitor 20 is reduced to half, thereby indicating the miles per gallon having changed to half of its original value.

Further, as shown in FIG. 2, if as shown between times $t_3$ and $t_4$ the pulse signal 30 output from the fluid flow meter 12 is changed back to its original value but the voltage signal 32 from the tachometer generator 10 is reduced to half its original signal, then the charging rate of the capacitor 20 is now at half of its previous value. Thus, the saw tooth wave voltage signal 34 output to the amplifier 24 is half its original value shown in time $t_1$ to $t_2$.

The apparatus of the present invention as described above and as shown in FIG. 1 can be used in any type of vehicle in order to provide a measure of the fuel efficiency or the fuel consumption rate of the vehicle. Therefore, the apparatus of the present invention can be used on boats, automobiles, airplanes or any other such vehicle where an instantaneous measurement of fuel efficiency is needed.

Further, the apparatus of the present invention can be used in any application where a mere indication of a distance quantity such as shaft rotation relative to the flow of a fluid measured in volumes such as gallons is needed. Such an indication need not be related to fuel efficiency but can be related to, for example, revolutions per gallon of fluid.

While the present invention has been described in terms of its preferred embodiment, it should be noted that numerous modifications may be made thereto without departing from the spirit and scope of the invention as defined in the appended claims. For example, the present invention may be used in any application which may require apparatus for measuring the distance traveled by a vehicle per unit quantity of fuel. It is intended that all such modifications fall within the scope of the appended claims.

I claim:

1. An apparatus for measuring the distance traveled by a vehicle per unit quantity of fuel, comprising:
   a magnetic type generator for generating a voltage signal proportional to speed of said vehicle;
   means for generating a pulse signal proportional to volume of fuel consumed by said vehicle;
   switching means for cycling between open and closed positions in response to said pulse signal; and
   energy storage means, electrically connected to said magnetic type generator and said switching means, for storing a charge from said voltage signal when said switching means is in said open position and discharging said stored charge when said switching means is in said closed position, thereby generating a fuel consumption signal representing distance traveled per unit quantity of fuel.

2. The apparatus according to claim 1 wherein said energy storage means includes a capacitor.

3. The apparatus according to claim 2, wherein said means for generating a pulse signal is provided by a fluid flow meter.

4. The apparatus according to claim 3, wherein said fluid flow meter is provided by a rotary vane flow meter.

5. The apparatus according to claim 4, further comprising:
   indicator means, electrically connected to said energy storage means, for indicating fuel efficiency of said vehicle in response to said fuel consumption signal and having a dynamic damping for causing said indicator means to respond to an average voltage of said fuel consumption signal generated by said energy storage means.

6. The apparatus according to claim 2, further comprising:
   indicator means, electrically connected to said energy storage means, for indicating fuel efficiency of said vehicle in response to said fuel consumption signal and having a dynamic damping for causing said indicator means to respond to an average voltage of said fuel consumption signal generated by said energy storage means.

7. The apparatus according to claim 1, wherein said means for generating a pulse signal is provided by a fluid flow meter.

8. The apparatus according to claim 7, wherein said fluid flow meter is provided by a rotary vane flow meter.

9. The apparatus according to claim 8 further comprising:
   indicator means, electrically connected to said energy storage means, for indicating fuel efficiency of said vehicle in response to said fuel consumption signal and having a dynamic damping for causing said indicator means to respond to an average voltage of said fuel consumption signal generated by said energy storage means.

10. The apparatus according to claims 7 further comprising:
    indicator means, electrically connected to said energy storage means, for indicating fuel efficiency of said vehicle in response to said fuel consumption signal and having a dynamic damping for causing said indicator means to respond to an average voltage of said fuel consumption signal generated by said energy storage means.

11. The apparatus according to claim 1 further comprising:
    indicator means, electrically connected to said energy storage means, for indicating fuel efficiency of said vehicle in response to said fuel consumption signal and having a dynamic damping for causing said indicator means to respond to an average voltage of said fuel consumption signal generated by said energy storage means.

12. An apparatus for measuring the distance traveled per unit quantity of fuel, comprising:
    a magnetic type generator for generating a voltage signal proportional to speed of said vehicle;
    means for generating a pulse signal proportional to a volume of fuel consumed by said vehicle;
    switching means for cycling between open and closed positions in response to said pulse signal;
    energy storage means, electrically connected to said magnetic type generator and said switching means, for storing a charge from said voltage signal when said switching means is in said open position and discharging said stored charge when said switching means is in said closed position, thereby generating a fuel consumption signal representing distance traveled per unit quantity of fuel of said vehicle; and
    indicator means, electrically connected to said energy storage means, for indicating fuel efficiency of said vehicle in response to said fuel consumption signal and having a dynamic damping for causing said indicator means to respond to an average voltage of said fuel consumption signal generated by said energy storage means.

* * * * *